(No Model.)
O. A. ENHOLM.
COMPOSITION OF MATTER FOR MAKING CELLS OR RETAINING VESSELS.
No. 438,311. Patented Oct. 14, 1890.
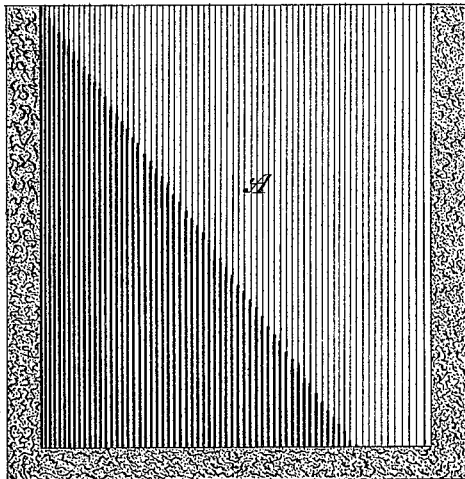
WITNESSES:
William Goebel.
Ernest H. Thomas
INVENTOR
Oscar A. Enholm
BY
P. F. Bourne
ATTORNEY.

UNITED STATES PATENT OFFICE.

OSCAR A. ENHOLM, OF NEW YORK, N. Y., ASSIGNOR, BY DIRECT AND MESNE ASSIGNMENTS, TO THE ENHOLM ELECTRICAL CONSTRUCTION COMPANY, OF SAME PLACE.

COMPOSITION OF MATTER FOR MAKING CELLS OR RETAINING-VESSELS.

SPECIFICATION forming part of Letters Patent No. 438,311, dated October 14, 1890.

Application filed February 19, 1890. Serial No. 341,033. (No specimens.)

*To all whom it may concern:*

Be it known that I, OSCAR A. ENHOLM, a resident of the city, county, and State of New York, have invented a certain new and Improved Composition of Matter for Making Cells or Retaining-Vessels, of which the following is a specification.

The object of my invention is to provide a composition for making light, strong, liquid-tight and thoroughly acid-resisting vessels.

The invention consists in the novel details of improvement that will be more fully hereinafter set forth, and then pointed out in the claims.

Reference is to be had to the accompanying drawing, forming part of this specification, wherein the figure is a sectional view showing a vessel made of my composition.

In carrying out my invention I mix asbestus (in fibers or woven cloth) with mineral wax, gutta-percha, and shellac, which forms a plastic material. A good proportion of parts I judge to be as follows: asbestus fibers, forty parts; mineral wax, thirty parts; gutta-percha, thirty parts; shellac, ten parts; but the proportion may be varied as desired.

I prefer to first melt together the mineral wax, gutta-percha, and shellac, stir the mass to properly mix it, then add the asbestus, and then thoroughly mix all together while heated. The above mixture is then formed into the desired shape by pressing it in molds or otherwise while hot and then allowing it to cool, whereby the vessel A (shown in the figure) or any other desired shape of vessel can be produced; but the mixture may be made into the desired form in any other desired manner.

Instead of combining loose asbestus fibers with the mixture of mineral wax, gutta-percha, and shellac, I may apply the above mixture to woven asbestus-cloth by saturating or permeating said cloth with said mixture while it is in a heated state.

A vessel composed of my improved composition will be perfectly water-tight, will thoroughly withstand the action of chemicals, and will be extremely strong and rigid, the composition when hard being very tough.

Of course my improved composition can be used to make other articles than cells or retaining-vessels, if desired.

The fibers of the asbestus, in connection with the other ingredients, make the vessel extremely strong.

I can, if I desire, omit shellac, or in place of shellac use resin or another desired hardening gum or medium. The shellac or its equivalent acts to harden the mass when it is cold.

I do not herein claim a composition without a hardening medium, as that is the subject of an application filed by me March 28, 1890, Serial No. 346,664.

Having now described my invention, what I claim is—

1. The composition herein described, consisting of asbestus, mineral wax, gutta-percha, and a hardening medium, substantially as described.

2. The composition herein described, consisting of asbestus, mineral wax, gutta-percha, and shellac, substantially as described.

OSCAR A. ENHOLM.

Witnesses:
T. F. BOURNE,
ERNEST F. SLOCUM.